United States Patent [19]
Hall et al.

[11] Patent Number: 6,074,247
[45] Date of Patent: Jun. 13, 2000

[54] LAN DISTRIBUTION MODULE

[75] Inventors: Lawrence Alton Hall, Harrisburg; William John Schnoor, Hummelstown; Keith James McKechnie, Harrisburg, all of Pa.

[73] Assignee: The Whitaker Corporation, Wilmington, Del.

[21] Appl. No.: 09/059,583

[22] Filed: Apr. 14, 1998

Related U.S. Application Data

[63] Continuation-in-part of application No. 09/004,158, Jan. 7, 1998.
[60] Provisional application No. 60/034,025, Jan. 8, 1997.

[51] Int. Cl.[7] .................................................. H01R 13/60
[52] U.S. Cl. ............................. 439/532; 455/3.1; 361/728
[58] Field of Search .............................. 439/532; 455/3.1; 361/728

[56] References Cited

U.S. PATENT DOCUMENTS

| 5,192,227 | 3/1993  | Bales ............................. 439/532 |
| 5,276,279 | 1/1994  | Brownlie et al. ............... 174/65 R |
| 5,535,098 | 7/1996  | Jakob et al. ................... 361/752 |
| 5,734,656 | 3/1998  | Prince et al. .................. 370/401 |
| 5,838,548 | 11/1998 | Matz et al. .................... 361/784 |

*Primary Examiner*—Paula Bradley
*Assistant Examiner*—Truc Nguyen

[57] ABSTRACT

Modules (3) for distributing a local area network have, a network hub module (3a) containing network hub circuitry, multiple communication ports (17) on the network hub module (3a), a network interface module (3a) having output connectors (20) electrically terminating cables (26) extending to outlets (27) in various rooms of a building, the network interface module (3b) having input connectors (17) connected to respective output connectors (20), said input connectors (17) being connected by jumper cables (26) to respective ports (17) on the network hub module (3a).

5 Claims, 4 Drawing Sheets

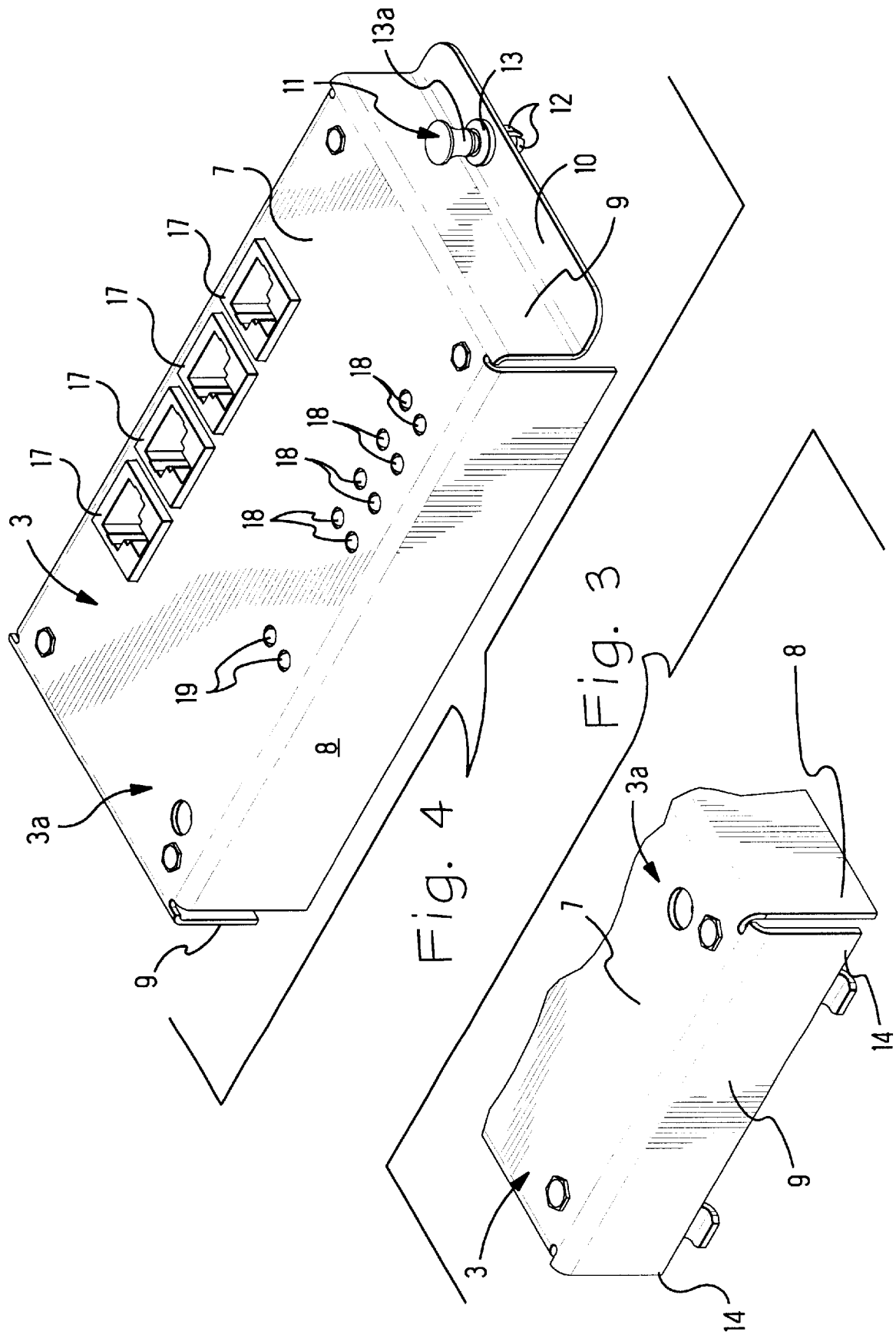

LAN DISTRIBUTION MODULE

CROSS REFERENCE TO RELATED APPLICATION

This application is a continuation in part of patent application Ser. No. 09/004,158, filed Jan. 7, 1998, in turn, claiming the benefit of provisional application Ser. No. 60/034,025, filed Jan. 8, 1997. The prior patent application is incorporated herein by reference.

FIELD OF THE INVENTION

The invention relates to a LAN distribution module, and more particularly, to a LAN distribution module adapted to mount in a distribution device for wiring.

BACKGROUND OF THE INVENTION

Some communications services to be distributed throughout the home are supplied from inside sources within the home itself, autonomous of outside service providers, as for example, closed circuit video systems, LAN, local area network, systems and home security systems.

To utilize the new services provided throughout the home, itself, both new and existing homes need a wiring infrastructure, comprised of different types of whole house distributed wiring. Different types of distributed wiring are needed to match the technical specifications for devices that deliver and convey the new services.

The distributed wiring within the home itself conveys the services throughout the home. The distributed wiring needs to be routed to the termination point of the incoming services and other system devices. A distribution device is required at the termination point to connect the distributed wiring with respective incoming services and other system devices.

For example, a distribution device comprises, a panel carrying a variety of input electrical connectors for connection of incoming service cables and inside services cables, and output electrical connectors for connection of the distributed wiring, and electrical circuits and functioning electronics on and behind the panel. Because the wiring infrastructure comprises different types of distributed wiring, such as electrical cables and optical fibers, the distribution device needs to be outfitted with different types of jacks that match the wiring.

Known distribution devices include, for example, the OnQ Structured Wiring System, available in different versions from AMP Incorporated, Harrisburg, Pa. One known version, the Series 100 Information Service Center, comprises, a box enclosure, and a panel with a hollow back that fits inside the enclosure. The panel carries an assortment of electrical connectors, collectively referred to as, input jacks for the terminated ends of service cables, and output jacks for the terminated ends of the wiring infrastructure. The hollow back of the panel covers the cables and other wiring that patches between the input and output jacks. The enclosure has a capacity for a single panel. A different panel is needed when different jacks are desired.

Other known versions, the Series 150 Information Services Center and the Series 200 Information Services Center, feature multiple panel capacity in a single enclosure, and industry standard hardware, EIA 19 inch rack and panel, to mount the multiple panels in the enclosure. The Series 200 Information Services Center has a space for a Control Services Module. The Control Services Module provides an interconnection panel for low voltage timing controls and settable controls for home automation of various systems, such as intruder security, lighting and HVAC equipment. Alternatively, the Control Services Module provides an interconnection panel for low voltage amplification and signal splitting or signal combining circuits. This module is in the form of I/O connectors on a cover plate that is bottom hinged against a bottom edge of an opening through a faceplate on the enclosure. The cover plate is secured by screws to the faceplate surrounding the faceplate opening that is sized to be slightly smaller than the perimeter of the cover plate.

SUMMARY OF THE INVENTION

LAN communications modules according to the invention provides a LAN hub and distributes LAN communications throughout the home. The modules further integrate the LAN hub with an outside server communicating with the LAN hub.

A network hub module provides a LAN communications hub and a number of communications ports. For example, the hub is an active 10BASE-T Ethernet hub with front panel mounted ports in the form of telephone type jacks.

A network interface module distributes LAN communications over cables to a number of communications outlets in rooms of a building, a dwelling, for example. The module provides distribution connection points for the cables, and provides for jumper connections with the communications ports of the network hub module.

Embodiments of the invention will now be described with reference by way of example to the accompanying drawings, according to which:

DESCRIPTION OF THE DRAWINGS

FIG. 3 is a fragmentary isometric view of a portion of the module shown in FIG. 4;

FIG. 4 is an isometric view of a network hub module; and

DETAILED DESCRIPTION

Figure 2:
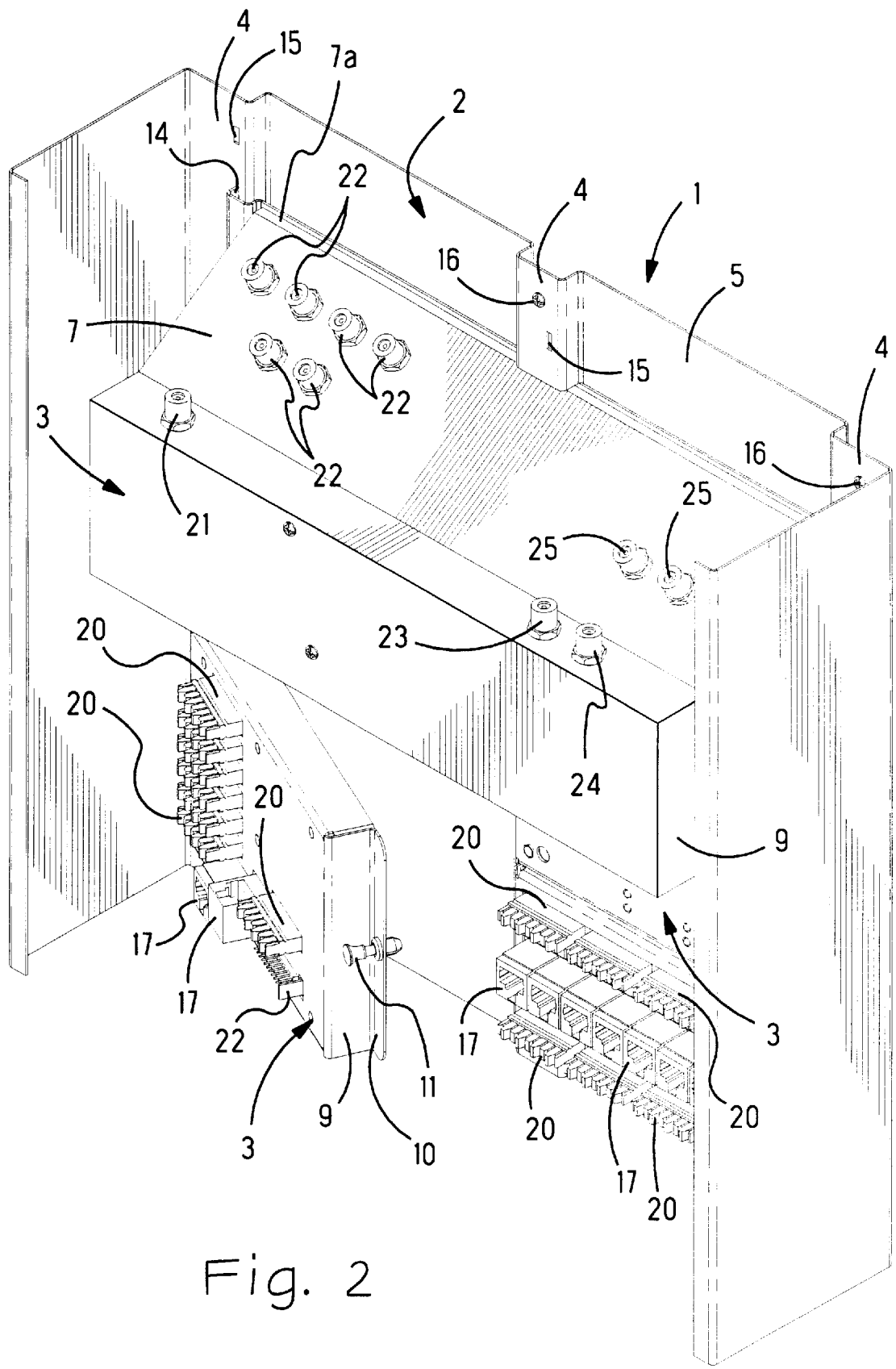
FIG. 2 is an isometric view of a distribution panel on which the modules of FIG. 1 are removably mounted.

With reference to FIG. 2, a distribution device 1 comprises, a distribution backbone 2 for mounting multiple modules 3. A feature of the distribution backbone 2 resides in a number of spaced apart rails 4 along a backboard 5. For example, a continuous sheet of metal is stamped and formed, with the metal being bent to project the rails 4 unitary with, and outward from, the backboard 5. The thickness of the sheet of metal forms the plane of the backboard 5 and the plane of each of the rails 4. The sheet of metal is further formed with sidewalls 6 projecting outward from the plane of the backboard 5 to form an enclosure that contains the rails 4 and the backboard 5. The invention pertains to other constructions of the rails 4 and the backboard 5, for example, a separate backboard 5, and the rails 4 being mounted on the backboard 5.

With reference to FIGS. 1 and 3–5, different embodiments of the modules 3 will now be described. Each of the modules 3 comprises a front facing panel 7. For example, a continuous sheet of metal forms the front facing panel 7. Each of the modules 3 bridges between two of the rails 4. These modules 3 can be provided with a hollow back that is formed by the corresponding sheet of metal being bent to form sides 8 and endwalls 9 that are unitary with the panel 7. The hollow back can be adapted to cover a circuit board, not shown. A back plate 7a covers the hollow back, and faces toward the rails 4 when the corresponding module 3 is mounted to the rails 4. The back plate 7a cooperates with the front facing panel 7 to provide a can for containing a circuit board, not shown, and electrical components, not shown. For example, circuit boards of different sizes are used to mount low voltage receivers, switches and other low voltage devices.

A flange 10 on one of the endwalls 9 has an opening through which a fastener 11 is received and captivated. At least one fastener 11 is needed for each module 3. For example, one form of the fastener 11 has a pair of spring prongs 12 that pass through the opening and spring apart to resist withdrawal from the opening. An enlarged head 13 on the quick release fastener 11 resists further passage through the opening. A spring loaded plunger 13a telescopes with the remainder of the fastener to spread the prongs 12 and provide a force fit in the opening. The plunger 13a can be partially withdrawn from a remainder of the fastener 11 to release the prongs 12 and remove the fastener from the opening in preparation to remove the module 3 from the rails 4. With reference to FIG. 3, each of the modules 3 has projecting hinge tabs 14 that are struck out of a corresponding endwall 9. The hinge tabs 14 are located at regularly spaced intervals.

A feature resides in adapting the distribution backbone 2 with modules 3 of various sizes. Each of the modules 3, as shown in FIGS. 1 and 3–5, has a width that bridges between at least two rails 4. Alternatively, a module 3 having a wider width, as in the module 3 shown in FIG. 2, bridges between more than two rails 4. Thus, each the modules 3 bridges across two rails 4, and in a different, larger size, bridges across more than two rails 4.

Figure 5:
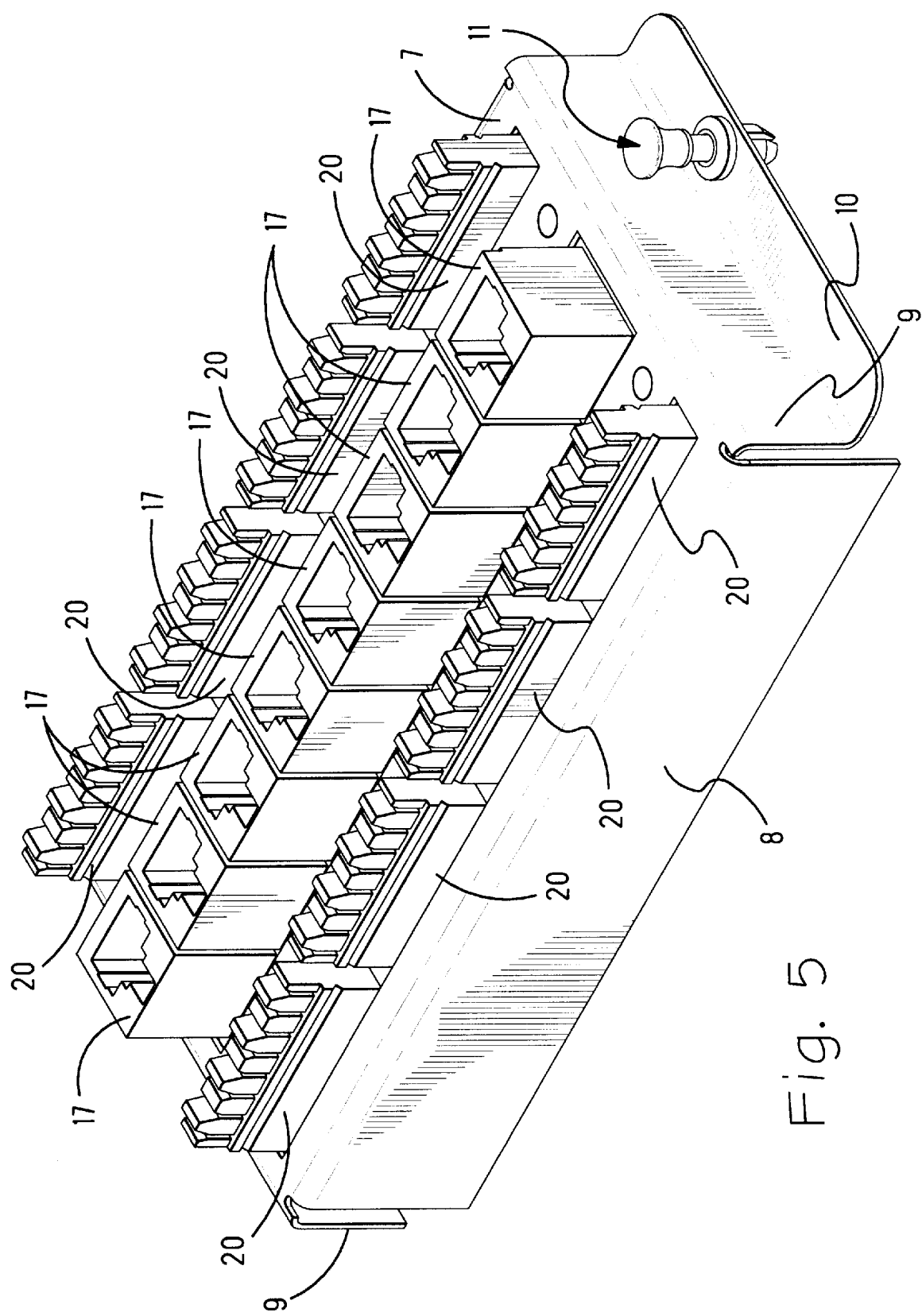
FIG. 5 is an isometric view of a network interface module.

A feature of the backbone 2 comprises a mounting structure for mounting a variable combination of modules 3 having different sizes. The backbone 2 allows a variable combination of different modules 3 to be mounted closely together. A first rail 4 is provided with a series of spaced apart slots 15, FIG. 1, into which the projecting tabs 14 of any module 3 are inserted to provide a hinge connection. The slots 15 are located at regularly spaced intervals matched to the internal spacing of the tabs 14. The hinge connection provides a quick release connection. Further, the hinge connection allows the module 3 to pivot on the hinge connection, as shown in FIG. 5, for movement of the hollow back of the module 3 toward the back panel 5. A second rail 4 is provided with sockets 16, located at regularly spaced intervals, into which a corresponding quick release fastener 11 secures to mount any of the modules 3 of narrower width, such as the modules 3 according to FIGS. 2 and 4. A third rail 4 is provided with similarly spaced sockets 16 into which corresponding quick release fasteners 11 secure to mount any of the modules 3 of wider width, such as the module 3 according to FIG. 5.

Any of the modules 3 of narrower width can bridge between the second rail 4 and the third rail 4. As shown in FIG. 2, the module 3, shown in FIG. 4, bridges between the second rail 4 and the third rail 4. Accordingly, the second rail 4 is provided with a series of spaced apart slots 15, at regularly spaced intervals, into which the tabs 14 of a corresponding module 3 are plugged to serve as a hinge connection to allow pivoting of the corresponding module 3 to bridge between the second rail 4 and the third rail 4. The quick release fastener 11 on the corresponding module 3 releasably secures in one of a series of spaced apart sockets 16 in the third rail 4.

Figure 1:
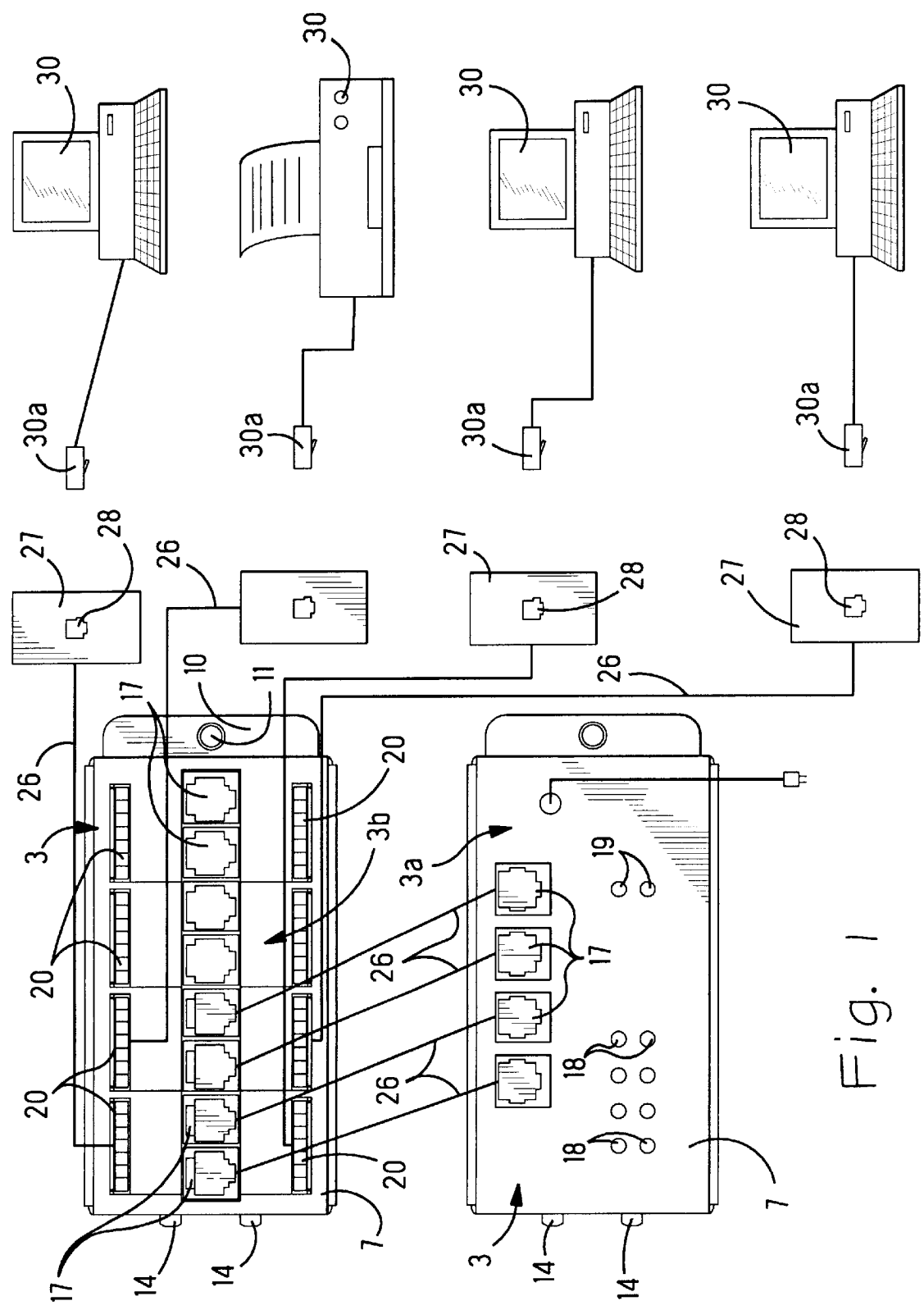
FIG. 1 is a schematic view of a network interface module and a network hub module supplying LAN communications and distributing LAN communications with outlets in rooms of a dwelling.

With reference to FIG. 1, distribution of LAN communications will now be described. A network hub module 3a and a network interface module 3b will now be described. The network interface module 3b has a front panel 7 provided with multiple output connectors 20 in the form of known 110 terminal blocks, or headers, that terminate color coded wires of cables 26 for connection to outlets 27 in various rooms. Each of the cables 26 is a four pair, Category 5 multiple conductor cable having its individual conductors terminated at first ends with insulation displacement terminals in the 110 header. The cables 26 extend to outlets 27 in various rooms of a building, a dwelling, for example. At opposite, second ends the conductors of the cables 26 are terminated with respective keyed electrical connectors 28 being keyed versions of the known, telephone jacks as specified in the National Standard Telephone System. The jacks are keyed to allow plugging in of matching keyed electrical connectors 30a in the form of keyed telephone type plugs as specified in the National Standard Telephone System. The plugs are on the communication cables linked to computer apparatuses 30, such as CPU's, central processor units, a shared printer and other computer peripheral devices. Unkeyed jacks, such as provided on voice telephone equipment, are unable to mistakenly plug into the jacks. The computer apparatuses 30 communicate with one another over a LAN, local area network. Each of the apparatuses 30 is equipped with a network interface card, such as a known 10BASE-T Ethernet interface card, and recognition software to identify and allow for two-way communications with each of the apparatuses 30 on the network. The panel 7 has multiple electrical input connectors 17, serving as LAN communication ports, in the form of universal telephone jacks, as specified by the National Standard Telephone System, connected with respective output connectors. The connections of the input connectors 17 to the output connectors 20 is provided by conducting paths on a circuit board, not shown, behind the panel 7.

With reference to FIGS. 3 and 4, a network hub module 3a has a front panel 7 containing network hub circuitry, for example, a 10BASE-T Ethernet hub, having the electrical circuit components as described in U.S. patent application Ser. No. 08/607,956, filed Feb. 29, 1996, incorporated herein by reference. A plug in power cord extends from the circuitry in the module 3a to plug into a standard electrical outlet, not shown, in the room of a dwelling. The network hub module 3a has four LAN communication ports 17 in the form of keyed versions of telephone jacks, as specified by the National Telephone System. The ports 17 provide plug in connections of jumper cable assemblies 26 having Category 5 four pair cables connected at opposite ends with keyed versions of telephone plugs, as specified by the National Standard Telephone System. The jumper cables 26 plug into respective input connectors 17 of the network interface module 3b to establish hub communication with each computer apparatus 30 by way of a corresponding port 17. As shown, a four port hub module 3a establishes hub communications with four computer apparatuses 30, using four of the input connectors 17 and four of the output connectors 20 of the network interface module 3b to establish respective data channels corresponding with individual computer apparatuses 30 and the hub circuitry. The panel 7 of the network hub module 3a has a set of pilot lights 18 that are light emitting to indicate continuity of signal flow of the data channels and the link from the hub to the computer apparatuses 30. An additional pair of LEDs 19 will illuminate to indicate respective signal flow in an input service cable, not shown.

Other embodiments and modifications of the invention are intended to be covered by the spirit and scope of the appended claims.

What is claimed is:

1. Modules for distributing a local area network comprising: a network hub module containing network hub circuitry, multiple communication ports on the network hub, a network interface module having output connectors electrically terminating cables extending to outlets in various rooms of a building, the network interface module having input connectors connected to respective output connectors, said input connectors being connected by jumper cables to respective ports on the network hub.

2. Modules as recited in claim 1, wherein each of said modules has hinge tabs to insert into a first rail on a distribution panel, and a releasable fastener to releasably secure in a second rail on the distribution panel.

3. Modules as recited in claim 1, wherein each of said modules has an enclosure formed by a panel and a back plate.

4. Modules as recited in claim 1, wherein each of said modules is mounted to a distribution panel.

5. Modules as recited in claim 4, wherein each of said modules has hinge tabs to insert into a first rail on said distribution panel, and a releasable fastener to releasably secure in a second rail on said distribution panel.

* * * * *